US006483553B1

United States Patent
Jung

(10) Patent No.: US 6,483,553 B1
(45) Date of Patent: Nov. 19, 2002

(54) TV RECEIVER FOR DIGITAL/ANALOG COMBINED USE

(75) Inventor: Gwon Sool Jung, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/311,284

(22) Filed: May 14, 1999

(30) Foreign Application Priority Data

May 15, 1998 (KR) .............................. 98-17608

(51) Int. Cl.[7] .............................. H04N 3/27; H04N 5/46; H04N 5/44; H04N 5/50; H04N 5/455; H03D 3/18; H04B 7/00

(52) U.S. Cl. ..................... 348/731; 348/725; 348/726; 348/554; 348/558; 348/555; 375/327; 375/345; 455/234.1; 455/245.1

(58) Field of Search ................ 348/731, 726, 348/725, 554, 555, 556, 557, 558; 375/345, 327; 455/136, 232.1, 234.1, 240.1, 245.1, 250.1

(56) References Cited

U.S. PATENT DOCUMENTS

| 5,361,099 A | * | 11/1994 | Kim ........................ 348/555 |
| 5,461,427 A | * | 10/1995 | Duffield et al. ............. 348/555 |
| 5,475,442 A | * | 12/1995 | Matsushita et al. ......... 348/554 |
| 5,486,865 A | * | 1/1996 | James ....................... 348/465 |
| 5,532,748 A | * | 7/1996 | Naimpally ................. 348/432 |
| 5,557,337 A | * | 9/1996 | Scarpa ...................... 348/558 |
| 5,583,400 A | * | 12/1996 | Hulshof et al. ............. 315/371 |
| 5,598,221 A | * | 1/1997 | Miyahara et al. ........... 348/554 |
| 5,638,112 A | * | 6/1997 | Bestler et al. ................ 348/10 |
| 5,719,620 A | * | 2/1998 | Allio .......................... 348/49 |
| 5,852,406 A | * | 12/1998 | Edde et al. ............ 340/825.06 |
| 5,926,228 A | * | 7/1999 | Jeon et al. .................. 348/554 |
| 5,956,098 A | * | 9/1999 | Mizukami et al. .......... 348/735 |
| 5,999,802 A | * | 12/1999 | Aschwanden ............. 455/196.1 |
| 6,016,170 A | * | 1/2000 | Takayama et al. .......... 348/731 |
| 6,046,781 A | * | 4/2000 | LeRoy ....................... 348/731 |

* cited by examiner

Primary Examiner—John Miller
Assistant Examiner—Paulos Natnael
(74) Attorney, Agent, or Firm—Birch, Stewart, Kolasch & Birch, LLP

(57) ABSTRACT

The combined TV receiver can receive and process an analog broadcasting signal as well as a digital broadcasting signal, and includes a controller determining whether a channel selected by a user is a digital broadcast or an analog broadcast. The controller generates station selection data on the selected channel and a control signal pertinent to the determination. A tuner receives the station selection data and tunes to a broadcasting signal associated with the selected channel, out of signals received through an antenna. A switch unit forwards the broadcasting signal tuned at the tuner, in response to the control signal, to either an analog broadcasting processor or a digital broadcasting processor. An AGC (auto-gain controller) receives a gain signal either from the analog broadcasting processor or from the digital broadcasting processor, and adjusts a signal gain of the broadcasting signal tuned at the tuner, thereby allowing reception of both analog and digital signals.

17 Claims, 4 Drawing Sheets

TV RECEIVER FOR DIGITAL/ANALOG COMBINED USE

BACKGROUND OF THE INVENTION

1. Field of the Invention

The present invention relates to a TV, and more particularly, to a combined TV receiver which can receive and process an analog broadcasting signal as well as a digital broadcasting signal.

2. Background of the Related Art

The TV receiver is an appliance for decoding a broadcasting signal transmitted from a broadcasting station into an image signal and presenting image information to TV watchers. There are different standards of TV systems depending on scanning lines, frames per second, modulation type, channel bandwidth, video signal bandwidth, and audio channel modulation of a broadcasting signal transmitted from the broadcasting station, inclusive of the NTSC(National Television System Committee), PAL(Phase Alternation by Line), SECAM(Sequential Couleur a Memoire). The NTSC system is a standard system of a broadcasting signal having 525 scanning lines and transmitting 30 frames per second used in the north America, Japan and Korea. The NTSC system is compatible with black and white TV and has a simple driving circuit compared to other systems. The PAL system is a standard system of a broadcasting signal used in most European countries except some eastern European countries starting from France, in which a phase of one of two color difference signals are inverted at every scanning line in modulation. Though the PAL system has a somewhat poor compatibility with a black and white TV, a video signal of the PAL system is less influenced by a phase distortion caused by recording or transmission. The SECAM system is a standard system of a broadcasting signal developed in France and used in France, the old soviet union, east Europe and some African countries, in which a color subcarrier is frequency modulated and overlapped with a luminance signal while the two color difference signals are cut off in a sequence before transmission. Though the SECAM system is advantageous in small amplitude and phase distortions during transmission, a vertical resolution is poor.

FIG. 1 illustrates a block diagram of a related art analog TV receiver circuit schematically, of which operation will be explained. A tuning data is received at a tuner 1. Then, a VIF(Video Intermediate Frequency) 2 provides a video signal, of which synchronizing signal is detected by a synchronizing signal detector 3. If a synchronizing signal is contained in the signal received from the antenna, the signal is an analog signal, if there is no synchronizing signal, the signal is not an analog signal. An analog broadcasting receiver determines the presence of a broadcasting signal according to existence of a synchronizing signal, and stores a channel number having a broadcasting signal in a memory.

In the meantime, there have been research and other efforts for replacing a related art analog transmission type TV system with a digital transmission type TV gradually as digital technologies and video and audio data compression and restoring technologies are developed. In such a digital terrestrial TV broadcasting transmission system, there is a system of the USA and a system of Europe. The USA system is a VSB transmission system in which a single carrier is used and the European system is a COFDM(Coded Orthogonal Frequency Division Multiplexing) transmission system in which multi carriers are used. Particularly, because the multi carriers are used, the COFDM system is strong against interference and ghost in multiple path channel and allows to construct an SFN(Single Frequency Network) which can make a wide band transmission in a signal frequency. Because the present carrier condition is sensed in the COFDM system for making a Viterbi decoding with reference to the channel condition, an interference between channels or a selective fading of a frequency affect system performance, seriously. Therefore, as shown in FIG. 2, in the COFDM system, a signal called pilot 5 having a predictable value is added at every fixed intervals both in frequency axis Nf and time axis Nt directions between carriers of data at a transmitter side before transmission, which is used in synchronization or equalizing required in reception for restoring data at a receiver side. Together with this, the related art COFDM transmitter side transmits TPS(Transmission Parameter Signaling) including information on various transmission modes, and the receiver side decodes the TPS for use in demodulation. That is, the COFDM system is characterized in the use of multi carrier intransmission as well as the addition of pilots before transmission for use at the receiver side.

FIGS. 3a and 3b illustrate reception blocks in a COFDM system. As shows, signals (t) received through an antenna is amplified as necessary through a transmission channel 11 and the amplification terminal 12. An amplification gain is controlled through an AGC(Auto Gain Controller) 16. The amplified signal is digitized at an A/D converter 13, provided to an I & Q demodulator 14, and converted into of an I signal and a Q signal. The I signal and Q signal are subjected to adjustment of frequencies and powers as they pass through an FFT(Fast Fourier Transformer) block 15 and an equalizer 31, and are restored into an original data as they pass through a demapper 32, deinterleavers 33 and 36 and FEC(Forward Error Corrector)(not shown). At first, the received data is provided to a course timing block 17 for being divided into an effective data interval and a guard interval. The course timing block 17 shifts data by one interval to obtain correlation between data, and provides the correlation to an FFT start window generator 18 for establishing an interval of the data appropriate for subjecting to FFT. After the I & Q composite signals are converted at the FFT block 15, TPS information is demodulated. The TPS demodulator 19 analyzes the pilot signals, and corrects frequency and time basis distortions of the received data using a result of the analysis, to decode a correct TPS signal. The pilot signals are detected from the signal subjected FFT at a scattered pilot extractor 20 and analyzed at an IFFT block 21 and a narrow & fine frequency controller 22 for obtaining a correct frequency band of the signal. The signal subjected to FFT is provided to a continual pilot extractor 23 for being frequency synchronized by which an error in a received frequency is corrected. And, the fine timing block 24 receives the data subjected to FFT and decodes a pilot signal in the data, for finding an exact timing of conversion of the FFT. The signal having frequency synchronized and frequency band corrected through the IFFT block 21, the narrow & fine frequency controller 22, and the fine timing block 24 is provided to the FFT block 15, again. The signal provided to the FFT block 24 is corrected for an error in a data carrier by hard or soft decision. The FFT 15 should be provided in a COFDM demodulating system for receiving an I signal and a Q signal and transform into frequency components. The signal transformed into the frequency components at the FFT is provided to a TPS(Transmission Parameter Signalling) decoder 19.

A memory 2 stores a signal from the FFT block 15 and provides the stored signal to the equalizer 31, and the equalizer 31 compensates for a distortion in a frequency response signal caused in a transmission channel. The demapper 32 receives both the signal having distortion compensated at the equalizer 31 and a TPS signal from the TPS decoder 19, and analyzes a mapped signal. The internal deinterleaver 33 subjects the signal analyzed at the demapper 32 to internal deinterleave, and provides the result to a Viterbi decoder 34. The Viterbi decoder 34 receives both a signal from the internal deinterleaver 33 and the TPS signal, and subjects to viterbi decoding. An external deinterleaver 36 subjects the signal subjected to internal interleave to external interleave with reference to a synchronizing signal detected at a synchronizing signal detector 35. RS decoder 37 and a derandomizer 38 process the signal subjected to external interleave, for extracting a broadcasting signal of the channel the user selected. Also, the TPS decoder 19 receives a frequency component from the FFT block 15, analyzes a modulation type of the signal, and provides a result of the analysis to a processor(not shown). In this instance, different parameters are provided to the TPS decoder in succession until a right modulation type of the signal is analyzed. Accordingly, when the right modulation type of the signal is analyzed, the processor stores a channel of the signal having analyzed by the TPS decoder in an internal memory. If the TPS decoder can not detect the modulation type of the signal, the digital tuner receives information on a new channel number, and the aforementioned process is repeated. The TPS decoder is adapted to provide a right result only when the entire COFDM demodulator in the digital broadcasting receiver is operative regularly.

Most of the digital broadcasting signals provided to such digital TV receivers are based on the MPEG standards. Particularly, the MPEG-3 which is an MPEG standard for broadcasting and has all standards for system, audio and video established therein. For reference, the system standard No. in the MPEG-2 is ISO/IEC 13818-1, the video standard No. is ISO/WEC 13818-2, and the audio standard No. is ISO/IEC 13818-3.

A system and operation of a related art digital TV receiver based on the MPEG-2 standard will be explained with reference to FIG. 4.

Referring to FIG. 4, the related art digital TV receiver is provided with a tuner 100 for receiving a digital broadcasting signal, an IF converter 110 for subjecting the digital broadcasting signal received from the tuner 100 to frequency conversion to provide an intermediate frequency signal, a channel decoder 120 for detecting a pilot signal from the IF signal and decoding a lower frequency broadcasting signal, a TP parser 130 for parsing a TP signal from the lower frequency broadcasting signal to detect audio/video signals, audio/video decoders 140 and 150 for decoding the audio/video signals parsed at the TP parser, respectively, an audio signal converter 170 for converting a digital audio signal decoded at the audio decoder, a TV microprocessor 200 for controlling a TV system, a ROM 210 storing channels, programs, and the like, a RAM 220 for storing temporary data following operation of the TV microcomputer 200, an OSD processor 190 for processing OSD text, a switch unit 160 for selective forwarding the digital video signal decoded at the video decoder and the OSD text from the OSD processor 190, and a video signal encoder 180 for converting a video signal from the switch unit 160 into an image signal displayable on a TV or a monitor.

The tuner 100 receives and detects a QPSK(Quadrature Phase Shift Keying) signal or a QAM(Quadrature Amplitude Modulation) signal. The IF converter 110 receives a signal detected at the tuner and converts it into a signal of IF band, because the high frequency signal in a very high frequency band detected at the tuner can not be processed by a driving circuit of the digital TV, directly. The channel decoder, identical to the COFDM receiver block shown in FIGS. 3a and 3b, detects a pilot signal from the IF signal, decodes a baseband signal, converts the baseband signal into a digital signal, restores timing appropriate for the symbol rate, thereby correcting errors. The signal from the channel decoder 120 is a signal stream in the form of a transport stream packet in byte units. A transport signal stream as in MPEG-2 is a time-multiplexed signal stream named as a transport stream packet. The transport stream packet has a header at a beginning portion of the packet having a PID (Packet Identifier) number recorded therein. The PID number can be used as information which can demultiplex a time multiplexed signal. And, the PID number denotes a kind of the present packet, and, by analyzing the PID number, the present packet can be known as either a video packet, an audio packet, or program specific information. The video and audio standards in the MPEG-2 are standards on compressed video and audio signal streams. According to the MPEG-2 standards, all video signals, audio signals and program specific information signals are time-multiplexed, and transported as plural transport stream packets which can be identified with PID numbers.

The TP parser 130 parses a signal stream of such a transport stream packet form based on the PID number, and provides the result to respective decoders 140 and 150. That is, the TP parser 130 receives a transport signal stream through the tuner 100 and detects a PID number at a header of the signal stream. Thereby, the TP parser 130 parses a video signal stream, an audio signal stream and program specific information stream according to the PID numbers. Then, the TP parser 130 provides the video signal stream to the video decoder 150, the audio signal stream to the audio decoder 140, and the program specific information signal stream to the microcomputer 200.

The video decoder 150 decodes the video signal stream from the TP parser 130, and provides the result to the NTSC encoder 180. The video signal stream from the TP parser 130 is data compressed according to the MPEG-2 standards. According to this, the video decoder decompresses the compressed video signal stream, to restore an original digital video data. The audio decoder 140 decodes the audio signal stream from the TP parser 130, and provides to an audio digital to analog converter 170. The audio signal stream from the TP parser 130 is a data compressed according to the MPEG-1 standards. Therefore, the audio decoder 140 decompresses the compressed audio signal stream, to restore an original digital audio data. The audio digital to analog converter 170 converts digital audio data from the audio decoder 140 into an analog audio signal an amplifier or a speaker can process. The analog audio signal is presented as voice or sound by stereo speakers(not shown).

The NTSC encoder 180 converts the digital video data from the video decoder 150 into a luminance signal Y and a color difference signal C which can be displayed on a related art TV or a monitor. The luminance signal Y and the color difference signal C can be displayed by a CRT.

The microcomputer 200 controls operation of the digital TV receiver. And, programs and OSD information required for controlling the microcomputer 200 are stored in the ROM(Read Only Memory) 210, and temporary information required for the microcomputer control operation is stored in the RAM 220(Random Access Memory). That is, the microcomputer 200 processes the program specific information signal stream from the TP parser 130 and provides a program specific information data to the OSD processor 190 in response to control signals provided through a user input device 230, such as a remote controller or a key pad. Though OSD information is stored in the ROM 210, when a control signal is provided from the input device, the microcomputer 200 draws out OSD information corresponding to the control signal from the ROM 210 and provides it to the OSD processor 190. The OSD processor 190 converts the OSD information transmitted by the microcomputer 200 into a video signal that the NTSC encoder 180 can process. The switch unit 160 selects the OSD information converted into the video signal at the OSD processor 190 and the video signal converted at the video decoder 150 and provides the selection to the NTSC encoder 180. If no OSD information is provided according to the user input device, the switch unit 160 provides the video signal provided from the video decoder 150 to the NTSC encoder 180. And, if the OSD information is provided according to the user input device, the switch unit 160 provides the OSD information provided from the OSD processor 190 to the NTSC encoder 180.

However, the related art digital TV receiver can not receive an analog broadcasting signal, and the related art analog TV receiver can not receive a digital broadcasting signal. Therefore, if the user intends to watch both the analog broadcasting signal and the digital broadcasting signal, the user must provide two separate TV receivers, which is a substantial burden to the user.

SUMMARY OF THE INVENTION

Accordingly, the present invention is directed to a combined TV receiver which can receive and process an analog broadcasting signal as well as a digital broadcasting signal that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the digital/analog TV receiver includes a controller for determining a channel of user's selection of being of a digital broadcasting or an analog broadcasting, and generating a station selection data on the channel and a control signal pertinent to the determination, a tuner for receiving the station selection data and tuning to a broadcasting signal pertinent to the channel out of signals received through an antenna, an IF switch unit for selecting a direction of forwarding the broadcasting signal tuned at the tuner in response to the control signal, an analog broadcasting processor for demodulating the broadcasting signal selected at the IF switch unit into an audio signal and a video signal, a digital broadcasting processor for decoding the broadcasting signal selected at the IF switch unit into digital broadcasting information, and an AGC(auto-gain controller) for receiving a gain signal either from the analog broadcasting processor or from the digital broadcasting processor and adjusting a signal gain of the broadcasting signal tuned at the tuner.

It is foreseen that the digital TV broadcasting systems will use channels the present analog broadcasting systems do not use, frequently. Therefore, the digital TV broadcasting signals can be received by an existing analog TV antenna. Moreover, an output frequency band of a digital tuner is also similar to an output frequency band of a tuner of an existing analog TV receiver.

However, a digital TV broadcasting signal has program specific information in addition to video and audio information. The program specific information allows a digital TV receiver to provide more information than an analog TV receiver. The present invention utilizes the very feature of frequency common use between a digital TV receiver and an analog TV receiver and the distinctive feature of the digital TV receiver of having the program specific information, for providing a combined TV receiver which can receive and process both the analog broadcasting signal and the digital broadcasting signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute apart of this specification, illustrate embodiments of the invention and together with the description serve to explain the principles of the invention.

In the drawings.

DETAILED DESCRIPTION OF THE PREFERRED EMBODIMENT

Figure 5:
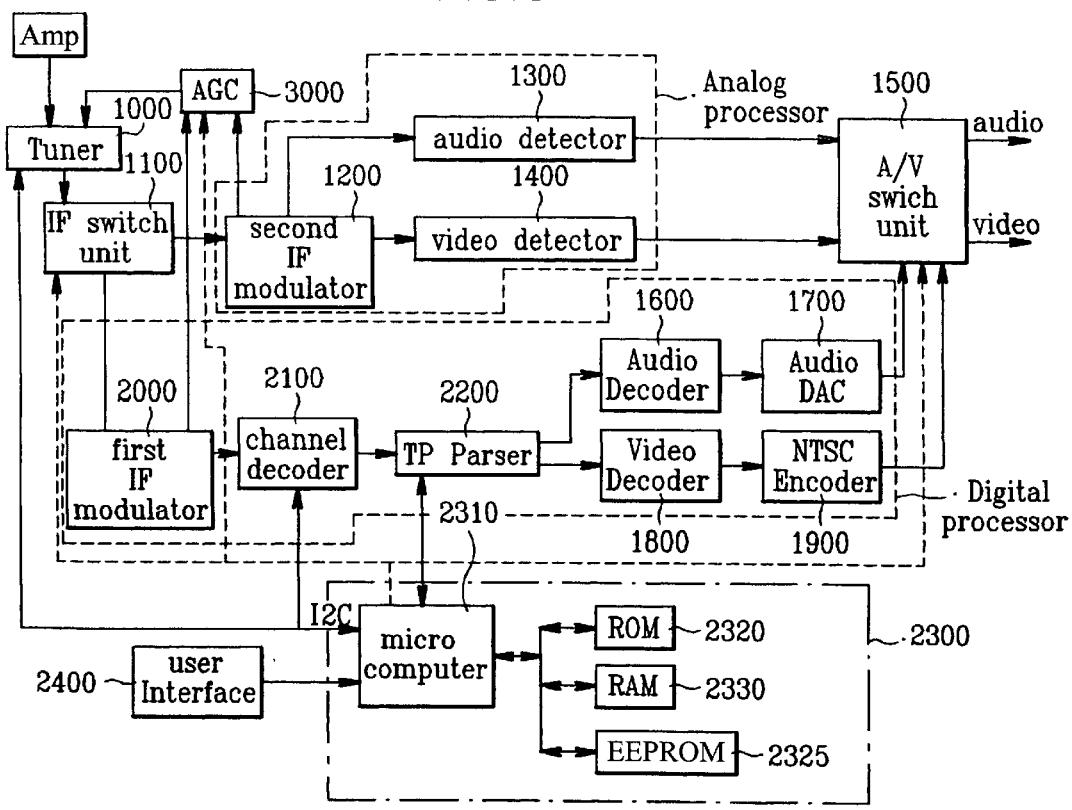

Reference will now be made in detail to the preferred embodiments of the present invention, examples of which are illustrated in the accompanying drawings. FIG. 5 schematically illustrates a block diagram of a combined TV receiver circuit in accordance with a preferred embodiment of the present invention.

A controller 2300 determines a channel of a user's selection, either a digital broadcasting or an analog broadcasting, channel, and provides a station selection data of the selected channel to a tuner 1000. The tuner 1000 is provided with the station selection data from the controller 2300, and selects a channel of a digital broadcasting signal and an analog broadcasting signal received through an antenna with reference to the station selection data. In this instance, the antenna is, for example, a combined antenna capable of receiving both the digital broadcasting signal and the analog broadcasting signal.

An IF switch unit 1100 is also provided with a control signal from the control unit 2300. In response to the control signal, either an analog broadcasting processor or a digital broadcasting processor is selected, and the broadcasting signal received through the antenna presently is provided thereto. That is, the IF switch unit 1100 provides the digital broadcasting signal and the analog broadcasting signal to different broadcasting processors. The analog broadcasting processor includes a second IF modulator 1200 for extracting an IF audio signal and an IF video signal from the analog broadcasting signal, an audio detector 1300 for demodulating the audio signal extracted at the second IF modulator 1200 into a baseband audio signal, and a video detector 1400 for demodulating the video signal extracted at the second IF modulator 1300 into a baseband video signal. Thus, if the broadcasting signal received presently is the analog broadcasting signal, the IF switch unit 1100 provides the analog broadcasting signal to the second IF modulator 1200 in the analog broadcasting processor. And, if the broadcasting signal received presently is the digital broadcasting signal, the IF switch unit 1100 provides the digital broadcasting signal to a first IF modulator 2000 in the digital broadcasting processor. In this instance, the broadcasting signal received presently is tuned by the control signal determined and provided by the controller 2300. As an example, the IF switch unit 1100 provides the broadcasting signal received presently to the digital broadcasting processor if the control signal from the controller 2300 is at high, and provides to the analog broadcasting processor if the control signal is at low. The determination by the IF switch unit 1100 in response to the control signal may be set to be opposite to the aforementioned explanation. That is, the broadcasting signal received presently may be provided to the analog broadcasting processor if the control signal from the controller 2300 is at high, and the broadcasting signal received presently may be provided to the digital broadcasting processor if the control signal from the controller 2300 is at low.

The second IF modulator 1200 receives the analog broadcasting signal from the IF switch unit 1100 and extracts an IF audio signal and an IF video signal. The first IF modulator 2000 receives the digital broadcasting signal from the switch unit 1100 and modulates 15 into an IF broadcasting signal. The audio detector 1300 demodulates the audio signal extracted at the second IF modulator 1200 into a low frequency band audio signal, to restore the IF audio signal into an original voice. The video detector 1400 demodulates the video signal extracted at the second IF modulator 1200 into a low frequency band video signal, to restore the luminance signal Y and the color difference signal C. Though not shown in the drawings, the luminance signal and the color difference signal are processed by an image processing circuit for displaying on a CRT.

Figure 1:
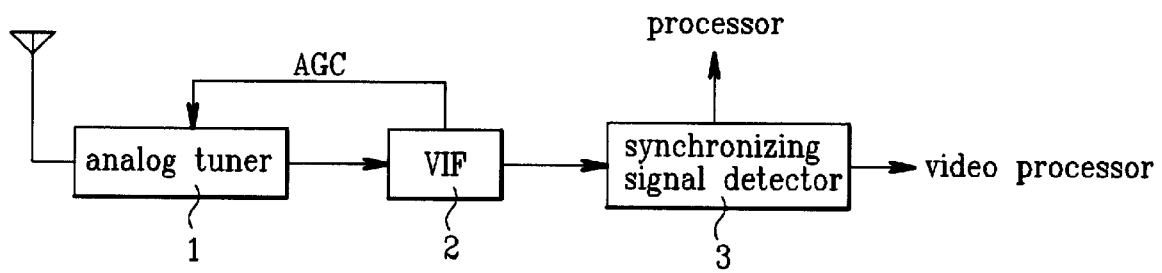
FIG. 1 illustrates a block diagram of a related art analog TV receiver circuit, schematically.
Figure 2:
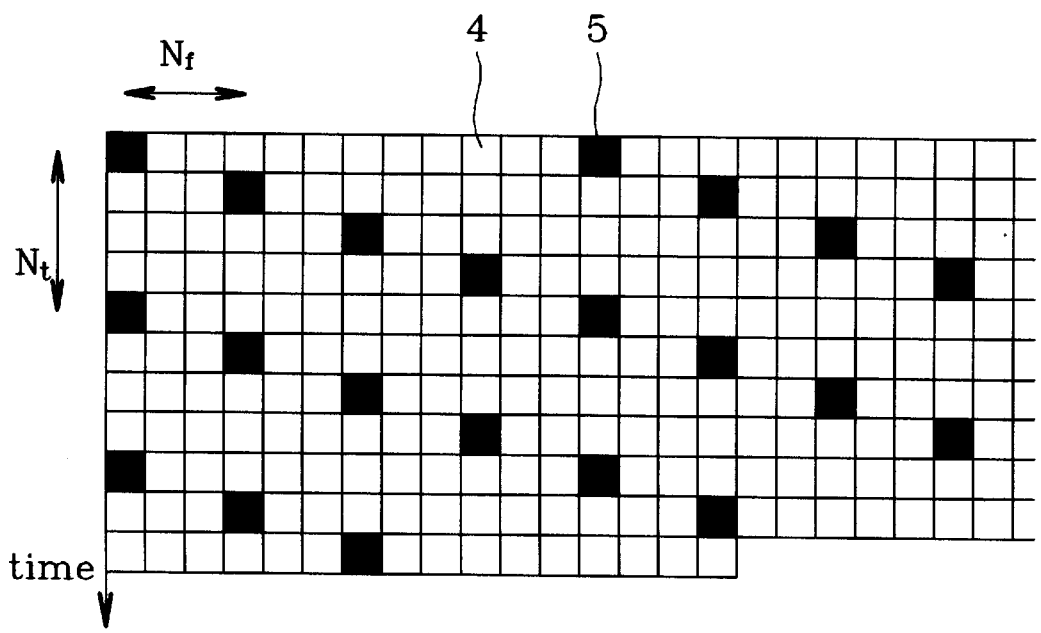
FIG. 2 illustrates a data of a related art digital TV COFDM added with pilots.
Figure 3A:
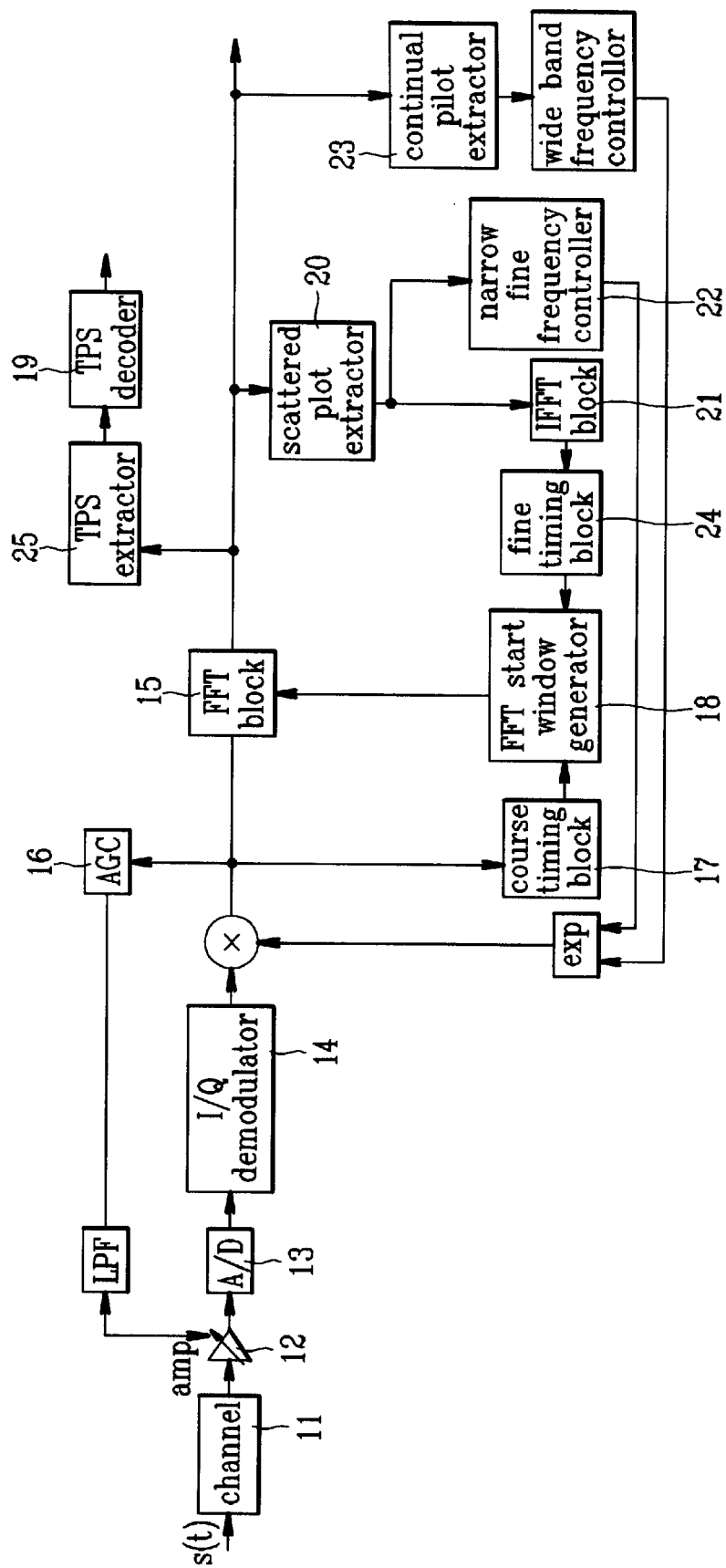
FIGS. 3a and 3b illustrate a reception block in a COFDM system.
Figure 3B:
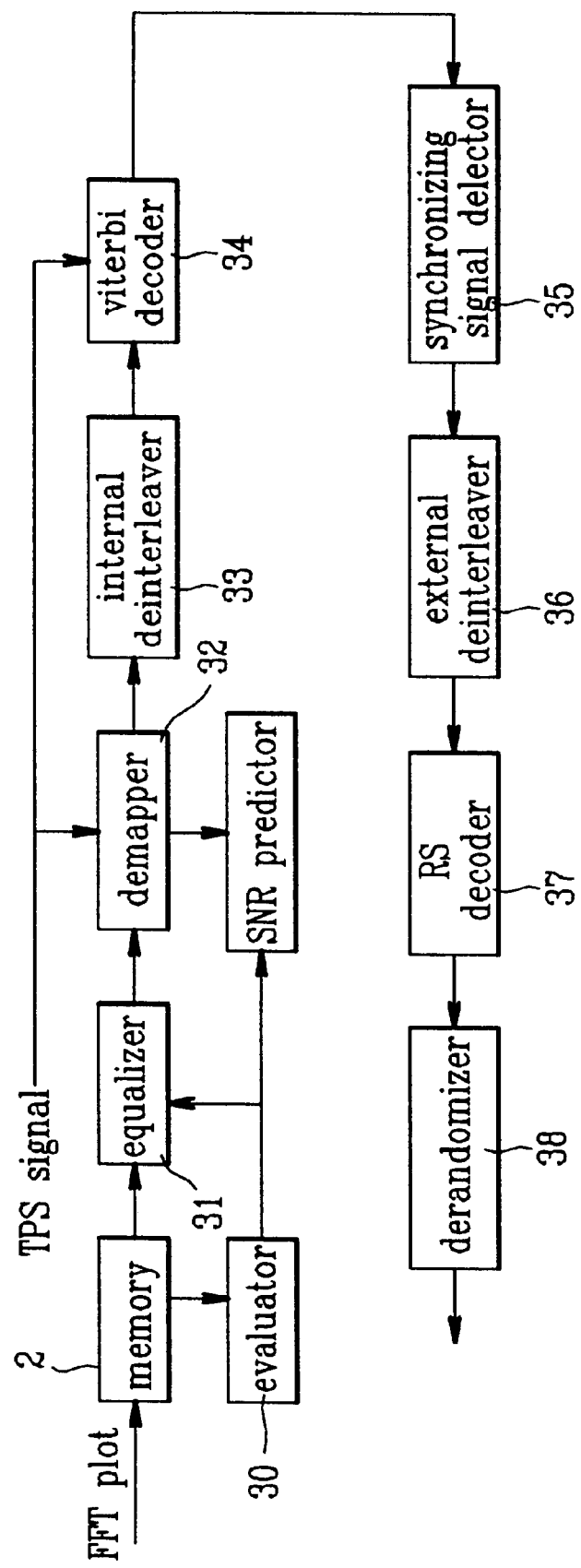
Figure 4:
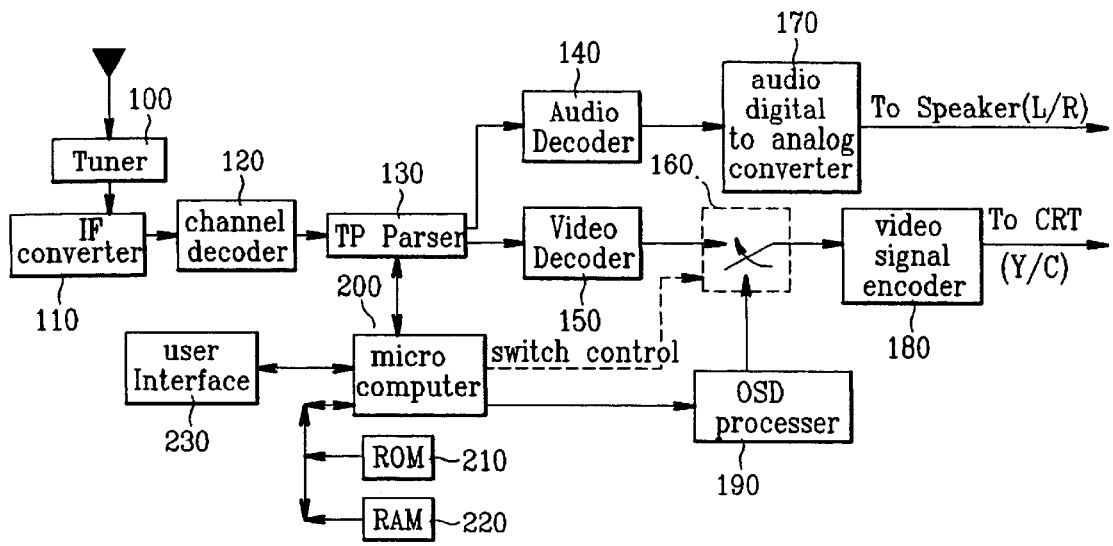
FIG. 4 illustrates a block diagram of a related art digital TV receiver circuit, schematically; and, FIG. 5 schematically illustrates a block diagram of a combined TV receiver circuit in accordance with a preferred embodiment of the present invention.

In the digital processor, a channel decoder 2100 receives the station selection data from the controller 2300, and decodes the broadcasting signal modulated at the second IF modulator 2000 into a digital signal. System and operation of the channel decoder are almost identical to the COFDM decoder in FIGS. 3a and 3b, and explanation of which will be omitted. As explained in the related art, the digital signal from the channel decoder is a transport bit stream signal stream. A TP(Transport Packet) parser 2200 reads the PID signals contained in a header portion of the transport bit signal stream from the channel decoder 2100, and parses the signal stream into an audio packet, a video packet, and a program specific information packet. The audio decoder 1600 decodes the audio packet from the TP parser 2200 into a digital audio signal. And, the video decoder 1800 decodes the video packet from the TP parser 2200 into a digital video signal. An audio digital-to-analog converter (DAC) 1700 converts the digital audio signal into an analog audio signal, and the video processor 1900 converts the digital video signal into a luminance signal Y and a color difference signal C. The audio DAC 1700 has a digital to analog converter, and the video processor 1900 has an encoder according to a broadcasting signal standard. As broadcasting signals of Korea, Japan and the USA are based on the NTSC standard, the video processor 1900 has an NTSC encoder.

The controller 2300 may receive, and subject the program specific information packet to OSD processing, or generate the station selection data on the channel of the user's selection and provide to the tuner 1000 and the channel decoder 2100 for selection of a broadcasting signal. And, the controller 2300 provides a control signal according to the station selection data to the switch unit 1100 and an audio/video switch unit 1500, for realizing the broadcasting signal to an image and voice. In this instance, the channel of the user's selection is applied by any one of a remote controller and a key input pad. An AGC 3000 selects one of gain signals from the analog broadcasting processor and the digital broadcasting processor in response to a control signal from the controller 2300 for adjusting a gain of the broadcasting signal tuned at the tuner. That is, when the controller 2300 determines the channel of the user's selection as an analog broadcasting signal and provides a control signal accordingly, the AGC 3000 is provided with a gain signal from the second IF modulator 1200 in the analog broadcasting processor for adjusting a gain (e.g., amplifier AMP) of the broadcasting signal tuned at the tuner 1000 presently. And, when the controller 2300 determines the channel of the user's selection as a digital broadcasting signal and provides a control signal accordingly, the AGC 3000 is provided with a gain signal from the first IF modulator 2000 in the digital broadcasting processor for adjusting a gain (e.g., amplifier AMP) of the broadcasting signal tuned at the tuner 1000 presently. The controller 2300 includes a ROM 2320 having a processing program of the program specific information packet, a system control program, and channel information on digital broadcasting systems stored therein, a microcomputer 2310 for conducting a program stored in the ROM 2320, reading channel information to generate a station selection ID data of the channel of user's selection, and determining the channel of user's selection of being the analog broadcasting or a digital broadcasting to generate a control signal accordingly, and RAM 2330 for storing additional data required for operation of the microcomputer 2310.

The controller 2300 is operative as follows.

Upon turning on a power to the TV receiver, if there is channel information already set, the microcomputer 2310 provides a station selection data of the channel to the tuner 1000 via an I2C bus, so that the tuner 1000 receives a digital broadcasting signal pertinent to the station selection data. If there is no channel information in the microcomputer 2310 of the TV receiver, that is, there is no channel information set up in the TV receiver, the microcomputer 2310 provides the station selection data of a channel set up as an initial value of a digital broadcasting to the tuner 1000 so that the tuner 1000 selects the channel set up as the initial value of a digital broadcasting. For example, if channel No. 1 is set up as the initial value, the microcomputer 2310 provides the station selection data on the channel No. 1, so that the tuner 1000 selects a broadcasting signal of the channel No. 1. If the broadcasting signal received in the channel No. 1 is not restored into a digital signal stream, i.e., a transport bit stream by the channel decoder 2100, it implies that there is no broadcasting signal in the channel No. 1. Then, the microcomputer 2310 provides a station selection data of another channel to the tuner 1000 for selecting a broadcasting signal of another channel. The microcomputer 2310 repeats the foregoing station selection process many times, for storing the program specific information of the channels of which digital signal streams are received in the RAM 2330 in a form of a table, so that, when the user selects an arbitrary channel later, the microcomputer 2310 refers to the table for determining a kind of the broadcasting signal of the user's selection. That is, if the broadcasting signal of the channel of user's selection is contained in the table stored in the RAM 2330, the microcomputer 2310 determines the broadcasting signal as a digital broadcasting signal, and, if not, as an analog broadcasting signal, to control the switch unit 1100 and the audio/video switch unit 1500.

Like the IF switch unit 1100, the audio/video switch unit 1500 selects a signal source in response to a control signal from the microcomputer 2310. First, if the microcomputer 2310 controls the IF switch unit 1100 so that the IF switch unit 1100 provides a broadcasting signal to the second IF modulator 1200, the audio/video switch unit 1500 processes an audio signal and a video signal from the audio detector 1300 and the video detector 1400. And, if the microcomputer 2310 controls the switch unit 1100 to provide a broadcasting signal to the IF modulator 2000, the audio/video switch unit 1500 processes the audio signal and the video signal converted into analog signals by the audio processor 1700 and the video processor 1900 respectively. Thus, the microcomputer 2310 in the digital/analog TV receiver of the present invention refers to the already stored station selection data on digital broadcasting signal for tuning to the broadcasting signal of the channel of user's selection. The station selection data on the digital broadcasting signal is stored in a separate memory 2325, preferably, an EEPROM, or flash memory.

The operation of the digital/analog TV receiver of the present invention will be explained following flow of a signal.

First, a user selects a channel number by an input device 2400, such as a remote controller. On reception of the channel number of the user's selection, the microcomputer 2310 determines of the channel number of being contained in the table of digital broadcasting signals stored in the RAM 2330 or the separate EEPROM 2325. If the channel number is a number contained in the table, the microcomputer 2310 determines the channel number of the user's selection as a digital broadcasting signal, and controls the switch unit 1100 and the audio/video switch unit 1500 to process the digital broadcasting signal. At the same time, the microcomputer 2310 provides the station selection data on the channel number of the user's selection to the tuner 1000 and the channel decoder unit 2100, so that the right broadcasting signal of the channel number is selected and processed. The tuner 1000 selects a broadcasting signal of the channel pertinent to the station selection data provided by the microcomputer 2310 and provides it to the IF switch unit 1100. The broadcasting signal provided to the IF switch unit 1100 is provided to the first IF modulator 2000 under the control of the microcomputer 2310, and modulated into a broadcasting signal of IF band. The broadcasting signal modulated into the broadcasting signal of IF band is provided to the channel decoder 2100, and decoded into a digital broadcasting signal of the channel pertinent to the station selection data provided from the microcomputer 2310. The digital broadcasting signal is parsed into an audio signal the video signal by the TP parser 2200, and audio signal is provided to the audio decoder 1600, and the video signal is provided to the video decoder 1800. The audio signal provided to the audio decoder 1600 is converted into an original digital audio data, and the video signal provided to the video decoder 1800 is converted into an original digital video data. The digital audio data is converted into an analog signal at the audio DAC 1700, and the digital video data is restored into a video signal having a luminance signal and a color difference signal. The audio signal from the audio DAC 1700 and the video signal from the video processor 1900 are presented to a speaker and a CRT by the audio/video switching unit 1500, respectively.

In the meantime, in a case when the channel number selected by the user is not contained in the table stored in the RAM 2330 or the separate EEPROM 2325, the microcomputer 2310 determines the channel number as an analog broadcasting signal. The microcomputer 2310 then controls the IF switch unit 1100 and the audio/video switch unit 1500 to process the analog broadcasting signal. At the same time, the microcomputer 2310 provides a station selection data pertinent to the channel number of the user's selection to the tuner 1000, so that the right broadcasting signal pertinent to the channel number is selected and processed. The tuner 1000 selects a broadcasting signal pertinent to the channel number provided by the microcomputer 2310 and provides it to the switch unit 1100. The broadcasting signal provided to the switch unit 1100 is applied to the second IF modulator 1200 under the control of the microcomputer 2310, and separated into an audio signal and a video signal. The audio signal of IF band is provided to the audio detector 1300, and the video signal of IF band is provided to the video detector 1400. The audio signal provided to the audio detector 1300 is restored into an audio signal of baseband frequency, and the video signal provided to the video detector 1400 is converted into an original video signal having a luminance signal and a color difference signal. The audio signal from the audio detector 1300 and the video signal from the video detector 1400 are presented to the speaker and the CRT, respectively by the audio/video switch unit 1500.

Thus, since the microcomputer 2310 determines a broadcasting signal of being of analog or digital with reference to the channel number table, the digital/analog TV receiver of the present invention allows the user to watch both broadcasting signals.

The combined functions of watching a digital TV signal and an analog TV signal of the digital/analog TV receiver of the present invention provides the user both with the digital broadcasting signal and the analog broadcasting signal. Particularly, by allowing users to watch both broadcasting signals even if the user does not purchase two kinds of TV receivers in a time transition when the digital TV and the analog TV are coexistent, an economic burden on the user is reduced.

It will be apparent to those skilled in the art that various modifications and variations can be made in the combined TV receiver of the present invention without departing from the spirit or scope of the invention. Thus, it is intended that the present invention cover the modifications and variations of this invention provided they come within the scope of the appended claims and their equivalents.

What is claimed is:

1. A digital/analog TV receiver, comprising:
   a controller for determining whether a channel selected by a user corresponds to a digital broadcast or an analog broadcast prior to presenting a broadcast signal for demodulation, and generating station selection data on the selected channel and a control signal based on the determination, wherein for the determination the controller uses a program additive information which exists merely in the digital broadcast in addition to video and audio information;

a tuner for receiving the station selection data and tuning to a broadcasting signal associated with the selected channel out of signals received through an antenna;

an analog broadcasting processor for demodulating an analog broadcasting signal into an audio signal and a video signal;

a digital broadcasting processor for decoding a digital broadcasting signal into digital broadcasting information;

a switch unit supplying output of the tuner to one of the analog broadcasting processor and the digital broadcasting processor; and an AGC(auto-gain controller) for receiving a gain signal from one of the analog broadcasting processor and the digital broadcasting processor and adjusting a signal gain of the broadcasting signal tuned at the tuner.

2. A digital/analog TV receiver as claimed in claim 1, wherein the digital broadcasting processor comprises:

an IF (intermediate frequency) modulator for modulating the digital broadcasting signal selected at the switch unit into a broadcasting signal of IF band, a channel decoder for receiving the station selection data and decoding the broadcasting signal modulated at the IF modulator into a digital signal, a TP parser for parsing the digital signal into an audio packet, a video packet and a program specific information packet, an audio decoder for receiving the audio packet and decoding the audio packet into a digital audio signal, a video decoder for receiving the video packet and decoding the video packet into a digital video signal, an audio processor for converting the digital audio signal from the audio decoder into analog audio signal, and a video processor for converting the digital video signal from the video decoder into a baseband video signal.

3. A digital/analog TV receiver as claimed in claim 2, wherein the IF modulator provides the broadcasting signal of IF band to the AGC.

4. A digital/analog TV receiver as claimed in claim 2, wherein the channel decoder provides a transport bit stream signal stream.

5. A digital/analog TV receiver as claimed in claim 2, wherein the video processor is an NTSC encoder.

6. A digital/analog TV receiver as claimed in claim 1, wherein the analog broadcasting processor comprises:

an IF (intermediate frequency) modulator for extracting an audio signal of IF band and video signal of IF band from the analog broadcasting signal selected at the switch unit;

an audio detector for demodulating the audio signal extracted at the IF modulator into a baseband audio signal, and a video detector for demodulating the video signal extracted at the IF modulator into a baseband video signal.

7. A digital/analog TV receiver as claimed in claim 6, wherein the IF modulator provides the video signal of IF band to the AGC.

8. A digital/analog TV receiver as claimed in claim 1, wherein the tuner comprises:

an RF amplifier for amplifying a broadcasting signal received through the antenna.

9. A digital/analog TV receiver as claimed in claim 1, wherein the digital broadcasting processor provides the controller with program specific information packets contained in the digital broadcasting signals received from the switch unit.

10. A digital/analog TV receiver as claimed in claim 1, wherein the selected channel is provided by any one selected from a remote controller and a key input pad.

11. A digital/analog TV receiver as claimed in claim 1, wherein the controller comprises:

a ROM having a processing program of digital broadcasting information, and a TV receiver system control program stored therein, a microcomputer for conducting the processing program and the control program stored in the ROM to generate the station selection data and the control signal, and a RAM for storing additional data required for operation of the microcomputer.

12. A digital/analog TV receiver as claimed in claim 1, further comprising:

an I2C bus connecting the controller and the tuner, and carrying the station selection data.

13. A digital/analog TV receiver as claimed in claim 12, wherein the I2C bus also connects to the channel decoder and carries the station selection data to the channel decoder.

14. A digital/analog TV receiver as claimed in claim 1, further comprising:

an audio/video switch unit for forwarding one audio signal of the audio signals processed at the analog video processor and the digital video processor to a speaker, and displaying one video signal of the video signals processed at the analog video processor and the digital video processor on a CRT.

15. A digital/analog TV receiver as claimed in claim 1, wherein the AGC selectively inputs the gain signal from the analog broadcasting processor and the digital broadcasting processor based on the control signal.

16. A digital/analog TV receiver as claimed in claim 11, wherein the controller comprises:

a memory storing the station selection data on the digital broadcasting signals for reference by the microcomputer.

17. A digital/analog TV receiver as claimed in claim 16, wherein the memory is one selected from an EEPROM or a flash memory.

* * * * *